US007418646B2

(12) United States Patent
Douglas (10) Patent No.: US 7,418,646 B2
(45) Date of Patent: Aug. 26, 2008

(54) INTEGRATED CIRCUIT USING WIRELESS COMMUNICATION TO STORE AND/OR RETRIEVE DATA AND/OR CHECK DATA

(75) Inventor: Chet R. Douglas, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 10/792,470

(22) Filed: Mar. 2, 2004

(65) Prior Publication Data

US 2005/0198557 A1 Sep. 8, 2005

(51) Int. Cl.
*H03M 13/00* (2006.01)
*G11C 29/00* (2006.01)
*G01R 31/28* (2006.01)

(52) U.S. Cl. .................. 714/758; 714/770; 714/712

(58) Field of Classification Search .......... 714/758, 714/763, 712, 715, 752, 753, 764, 770
See application file for complete search history.

(56) References Cited

U.S. PATENT DOCUMENTS

| 4,870,643 | A | 9/1989 | Bultman et al. |
| 5,088,081 | A | 2/1992 | Farr |
| 5,191,584 | A | 3/1993 | Anderson |
| 5,367,669 | A | 11/1994 | Holland et al. |
| 5,761,460 | A | 6/1998 | Santos et al. |
| 6,044,444 | A | 3/2000 | Ofek |
| 6,122,750 | A | 9/2000 | Hayasaka |
| 6,137,679 | A | 10/2000 | Chang |
| 6,223,217 | B1 | 4/2001 | Pettus |
| 6,370,604 | B1 | 4/2002 | Sreekanti |
| 6,473,849 | B1 | 10/2002 | Keller et al. |
| 6,490,596 | B1 * | 12/2002 | Micka ...................... 707/203 |
| 6,748,488 | B2 * | 6/2004 | Byrd et al. ................ 711/114 |
| 6,772,303 | B2 | 8/2004 | Crockett et al. |
| 6,775,792 | B2 * | 8/2004 | Ulrich et al. .................. 714/6 |
| 6,826,711 | B2 * | 11/2004 | Moulton et al. ............... 714/6 |

(Continued)

OTHER PUBLICATIONS

"RAID organization and performance" by Schwarz et al. This paper appears in: Distributed Computing Systems, 1992., Proceedings of the 12th International Conference on Publication Date: Jun. 9-12, 1992 On pp. 318-325 ISBN: 0-8186-2865-0 INSPEC Accession No. 4468186.*

(Continued)

*Primary Examiner*—Cynthia Britt
(74) *Attorney, Agent, or Firm*—Christopher K. Gagne; Caroline M. Fleming (57) ABSTRACT

In one embodiment, a method is provided that may include generating, at least in part by first circuitry comprised in an integrated circuit, check data based at least in part upon other data, and/or determining at least in part by the first circuitry, one or more locations of the check data and/or the other data in storage. The first circuitry may be capable of regenerating the other data based at least in part upon the check data. The method also may include issuing a request from second circuitry also comprised in the integrated circuit requesting that a wireless communication device transmit the other data, and/or receiving, by the second circuitry, a request issued from the wireless device, to retrieve the other data. Of course, many alternatives, variations, and modifications are possible without departing from this embodiment.

27 Claims, 3 Drawing Sheets

LEGEND
10 = SYSTEM
22 = BUS
38, 39 = MEMORY
40 = IC
44 = LINK(S)
50 = IC CHIP
100 = APPLIANCE
102, 104, 106 = IC CHIP(S)
107 = PROG. INSTR.
114A...114N = LINK(S)
116 = REQUEST
118 = DATA
120 = COPY
122 = PROCESS(ES)
124, 126, 128, 130, 132 = DRIVER
134 = REQUEST
136 = CHECK DATA
138 = REQUEST
140 = RAID
142A ... 142N = DEVICES
144A...144N = LOC.
150 = MOTHERBOARD
202 = PROC. CIRC.
204, 210 = I/F CIRC.
205 = CIRC.
216, 218 = PROC. CORE

U.S. PATENT DOCUMENTS

| | | | |
|---|---|---|---|
| 6,862,692 B2 * | 3/2005 | Ulrich et al. | 714/6 |
| 6,871,295 B2 * | 3/2005 | Ulrich et al. | 714/6 |
| 6,944,733 B2 * | 9/2005 | Zamer | 711/162 |
| 7,000,143 B2 * | 2/2006 | Moulton et al. | 714/6 |
| 7,093,033 B2 * | 8/2006 | Beckett et al. | 710/11 |
| 7,103,826 B2 * | 9/2006 | Thayer et al. | 714/763 |
| 7,206,989 B2 * | 4/2007 | Beckett et al. | 714/766 |
| 2002/0083111 A1 * | 6/2002 | Row et al. | 709/1 |
| 2003/0126200 A1 | 7/2003 | Wolff | |
| 2004/0039959 A1 | 2/2004 | LeCrone et al. | |
| 2004/0098518 A1 * | 5/2004 | Beckett et al. | 710/14 |
| 2006/0123270 A1 * | 6/2006 | Forhan et al. | 714/6 |

OTHER PUBLICATIONS

Julian Satran et al, "IP Storage Working Group Internet Draft", Category: Standards-track, draft-ietf-ips-iscsi-19.txt, Nov. 3, 2002, pp. 1-291.

* cited by examiner

INTEGRATED CIRCUIT USING WIRELESS COMMUNICATION TO STORE AND/OR RETRIEVE DATA AND/OR CHECK DATA

CROSS-REFERENCE TO RELATED APPLICATIONS

The subject application is related to U.S. patent application Ser. No. 10/301,028, entitled "Integrated Circuit Having Multiple Modes Of Operation," filed on Nov. 20, 2002; U.S. patent application Ser. No. 10/301,027, entitled "Integrated Circuit Having Multiple Modes Of Operation," filed on Nov. 20, 2002; U.S. patent application Ser. No. 10/442,705, entitled "Integrated Circuit Capable of Communicating Using Different Communication Protocols," filed on May 20, 2003; and U.S. patent application Ser. No. 10/317,606, entitled "Data Storage," filed on Dec. 11, 2002. Each of these related applications is assigned to the Assignee of the subject application.

FIELD

This disclosure relates to an integrated circuit.

BACKGROUND

In one conventional network data storage system, a server is coupled to a plurality of clients. The server includes a host processor coupled via a host chipset to a system memory. The host chipset comprises a host bridge/bus system that couples the host processor and system memory to a peripheral bus. The peripheral bus is coupled to a host bus adapter (HBA) that is coupled to a redundant array of inexpensive disks (RAID). The peripheral bus also is coupled to a network adapter that is physically coupled to the clients via network cabling.

In this conventional network data storage system, a client may issue, via a network cable, to the server a client request to store data in or retrieve data from the RAID. In response to the request, the server's network adapter transmits the request to the system memory via the peripheral bus and chipset, and, if the request is a request to store data in the RAID, the network adapter also transmits the data to the system memory via the peripheral bus and chipset. The memory then stores the request, and if transmitted to the memory by the network adapter, the data. The host processor retrieves the request from the system via the chipset, and in response to the request, the processor issues a request, via the chipset and peripheral bus, to the HBA to retrieve or store the data, as requested by the client request. If the request issued by the client is a request to store data in the RAID, the data is transmitted to HBA from the system memory via the chipset and the peripheral bus; the HBA then stores the data in the RAID. Conversely, if the request issued by the client is a request to retrieve data from the RAID, the HBA retrieves the data from the RAID, and transmits the data to the system memory via the peripheral bus and the chipset; thereafter, the data is transmitted to the network adapter from the system memory and the network adapter transmits the data to the client via the network cable.

Thus, in this conventional network data storage system, the performance of the client request to store data in or retrieve data from the RAID involves multiple transfers of the data via the peripheral bus and chipset. This may result in significant latency in completing the client request. Additionally, the processor, chipset, and HBA each comprise one or more respective integrated circuit chips. This may increase the design complexity of, and time involved in designing the server and network data storage system, and also may increase the cost and power consumption of the server. Furthermore, coupling the server and client together via network cabling may be time consuming, and the use of such cabling as the network communication media among the server and clients may limit and/or reduce the options available for the geographical locations of the clients and servers. Also, some clients derive particular utility from being portable; the use of such cabling as the network communication media in the network data storage system may reduce the portability, and therefore, the utility of such clients.

BRIEF DESCRIPTION OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
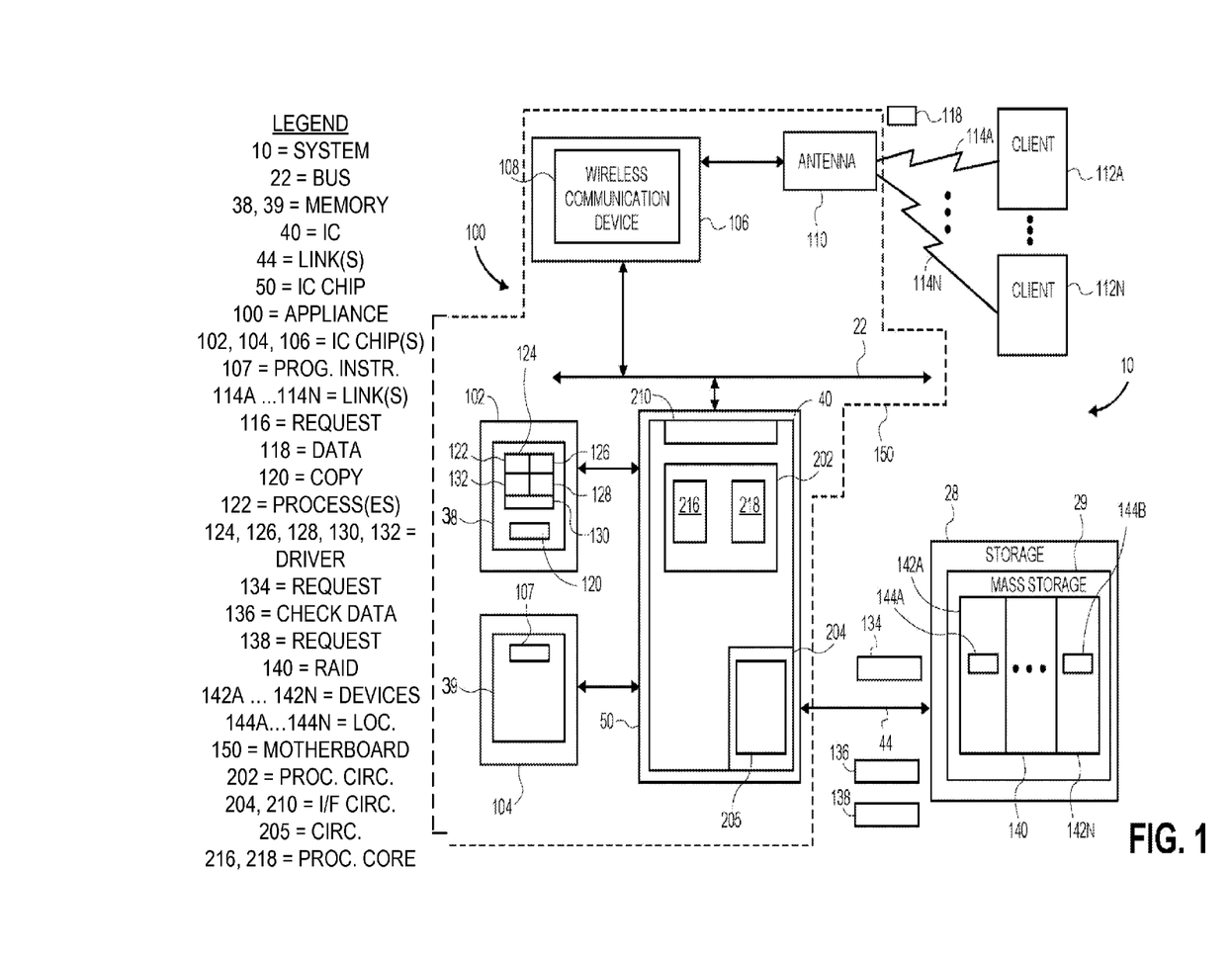
FIG. 1 is a diagram illustrating a system embodiment.

FIG. 1 illustrates a system embodiment 10. System 10 may comprise network appliance system 100 and one or more clients 112A . . . 112N. Network appliance system 100 may comprise circuit board 150 that may comprise wireless communication device 108, antenna 110, bus system 22, integrated circuit 40, memory 38, and memory 39.

As used herein, a "wireless communication device" means a device that is capable of issuing one or more signals to a wireless transmitter and/or that is capable of receiving one or more signals from a wireless receiver. In this embodiment, a wireless transmitter may comprise, for example, an antenna. Similarly, in this embodiment, a wireless receiver may comprise, for example, an antenna. Also as used herein, an "integrated circuit" means a semiconductor device and/or microelectronic device, such as, for example, a semiconductor integrated circuit chip.

In this embodiment, one or more integrated circuit chips 106 may comprise wireless communication device 108. Wireless communication device 108 may be coupled to antenna 110, and may be capable of exchanging data and/or commands with antenna 110. Additionally, wireless communication device 108 may be coupled to, and exchange data and/or commands via, bus system 22.

Although not shown in FIG. 1, system 10 may comprise a user interface system coupled to bus 22. The user interface system may comprise, e.g., a keyboard, pointing device, and display system that may permit a human user to input commands to, and monitor the operation of, system 10, system 10, and/or storage 28.

In this embodiment, bus system 22 may comprise a bus that complies with the Peripheral Component Interconnect (PCI) Express™ Base Specification Revision 1.0, published Jul. 22, 2002, available from the PCI Special Interest Group, Portland, Oreg., U.S.A. Alternatively, without departing from this embodiment, bus 22 may comprise a bus that complies with the Peripheral Component Interconnect (PCI) Local Bus Specification, Revision 2.2, Dec. 18, 1998, available from the PCI Special Interest Group, Portland, Oreg., U.S.A. Further alternatively, without departing from this embodiment, bus 22 instead may comprise a bus that complies with the PCI-X Specification Rev. 1.0a, Jul. 24, 2000, available from the aforesaid PCI Special Interest Group, Portland, Oreg., U.S.A. Yet further alternatively, without departing from this embodiment, bus 22 may comprise other types and configurations of bus systems.

Integrated circuit 40 may be coupled to, and exchange data and/or commands via bus 22. Integrated circuit 40 may be coupled to, and exchange data and/or commands with memory 38 and/or memory 39. In this embodiment, a single integrated circuit chip 50 may comprise integrated circuit 40. Additionally, in this embodiment, one or more integrated circuit chips 102 may comprise memory 38, and one or more integrated circuit chips 104 may comprise memory 39, respectively. Integrated circuit 40 and wireless communication device 108 may exchange data and/or commands via bus 22.

In this embodiment, a single circuit board 150 may comprise one or more chips 102, one or more chips 104, chip 50, bus 22, one or more chips 106, and antenna 110. Alternatively, without departing from this embodiment, a plurality of circuit boards and/or circuit cards (not shown) may comprise one or more chips 106, one or more chips 102, one or more chips 104, chip 50, bus 22, and/or antenna 110.

Integrated circuit 40 may be coupled to and control the operation of storage 28. In this embodiment, storage 28 may comprise mass storage 29. Mass storage 29 may comprise RAID 140. The RAID level that may be implemented by RAID 140 may be 0, 1, or greater than 1. As used herein, "storage" means one or more devices into which data may be stored and/or from which data may be retrieved. As used herein, "mass storage" means non-volatile, writable storage. RAID 140 may comprise a plurality of mass storage devices 142A . . . 142N. In this embodiment, each mass storage device 142A . . . 142N may comprise one or more solid state, optical disk, and/or magnetic disk mass storage devices. The number and types of mass storage devices comprised in mass storage devices 142A . . . 142N may vary without departing from this embodiment.

Additionally, without departing from this embodiment, storage 28 may not comprise RAID 140. In this alternative arrangement, storage 28 may comprise one or more mass storage devices that are not configured as a RAID.

Storage 28 may be comprised in one or more respective enclosures that may be separate from an enclosure in which board 150 may be enclosed. Alternatively, storage 28 may be comprised in the same enclosure in which board 150 may be comprised.

Integrated circuit 40 may be coupled to storage 28 via one or more network communication links 44. Integrated circuit 40 may exchange data and/or commands with storage 28, via links 44, using and/or in accordance with, e.g., Serial Advanced Technology Attachment (S-ATA) protocol, Small Computer Systems Interface (SCSI) over Internet Protocol (iSCSI) protocol, and/or Serial Attached Small Computer Systems Interface (SAS) protocol. Of course, alternatively, integrated circuit 40 may exchange data and/or commands with storage 28 using other and/or additional communication protocols, without departing from this embodiment. The number and types of network links comprised in links 44 may vary without departing from this embodiment.

In accordance with this embodiment, if integrated circuit 40 exchanges data and/or commands with storage 28 using and/or in accordance with S-ATA protocol, the S-ATA protocol may comply or be compatible with the protocol described in "Serial ATA: High Speed Serialized AT Attachment," Revision 1.0, published on Aug. 29, 2001 by the Serial ATA Working Group (hereinafter referred to as the "S-ATA Specification"), and/or a later developed and/or published version of the S-ATA Specification. If integrated circuit 40 exchanges data and/or commands with storage 28 using and/or in accordance with iSCSI protocol, the iSCSI protocol may comply or be compatible with the protocol described in Satran, "iSCSI," Internet-Draft Specification, draft-ietf-ips-iscsi-19, IP Storage Working Group of the Internet Engineering Task Force, published Nov. 3, 2002, by the Internet Engineering Task Force, Internet Engineering Task Force Secretariat c/o Corporation for National Research Initiatives, 1895 Preston White Drive, Suite 100, Reston, Va. 20191, United States of America (hereinafter referred to as the "iSCSI Specification"), and/or a later developed and/or published version of the iSCSI Specification. If integrated circuit 40 exchanges data and/or commands with storage 28 using and/or in accordance with SAS protocol, the SAS protocol may comply or be compatible with the protocol described in "Information Technology—Serial Attached SCSI (SAS)," Working Draft American National Standard of International Committee For Information Technology Standards (INCITS) T10 Technical Committee, Project T10/1562-D, Revision 2b, published 19 Oct. 2002, by American National Standards Institute (hereinafter termed the "SAS Standard"), and/or a later developed and/or published version of the SAS Standard.

Memories 38 and/or 39 each may comprise one or more of the following types of memories: semiconductor memory, programmable memory, non-volatile memory, read only memory, electrically programmable memory, random access memory, and/or flash memory. Either additionally or alternatively, memories 38 and/or 39 each may comprise other types of computer-readable memory. Also alternatively, memory 39 may be eliminated, or combined with memory 38 into a single memory, without departing from this embodiment.

Machine-executable program instructions may be stored in memory 38 and/or memory 39. As described below, these instructions may be accessed and executed by integrated circuit 40. When executed by integrated circuit 40, these instructions may result in integrated circuit 40 performing the operations described herein as being performed by integrated circuit 40.

One or more clients 112A . . . 112N may wirelessly exchange data and/or commands with appliance 100 via one or more wireless communication links 114A . . . 114N. This wireless exchange, via one or more links 114A . . . 114N, of data and/or commands, between appliance 100 and one or more clients 112A . . . 112N communication may be via antenna 110 comprised in appliance 100, and may be in accordance with, for example, transmission control protocol/internet protocol (TCP/IP), wireless Ethernet protocol, and/or iSCSI protocol. If this exchange of data and/or commands is in accordance with TCP/IP, the TCP/IP may comply or be compatible with the protocols described in Internet Engineering Task Force (IETF) Request For Comments (RFC) 791 and 793, published September 1981. If this exchange of data and/or commands is in accordance with wireless Ethernet protocol, the wireless Ethernet protocol may comply or be compatible with one or more of the protocols described Institute of Electrical and Electronics Engineers, Inc. (IEEE) Std. 802.11a-1999, published 1999, IEEE Std. 802.11b-1999, published 1999, IEEE Std. 802.11g-2003, published 2003, and/or other IEEE Std. 802.11x. If this exchange of data and/or commands is in accordance with iSCSI protocol, the iSCSI protocol may comply and/or be compatible with the protocol described in the iSCSI Specification. Without departing from this embodiment, the exchange, via one or more links 114A . . . 114N, of data and/or commands between appliance 100 and one or more clients 112A . . . 112N may be in accordance with other and/or additional communication protocols.

Integrated circuit 40 may comprise processor circuitry 202, interface circuitry 204, and interface circuitry 210. Processor circuitry 202 may include processor core circuitry that may comprise processor cores 216 and 218. As used herein, a "processor core" may comprise hardwired circuitry, programmable circuitry, and/or state machine circuitry. Also, as used herein, "circuitry" may comprise, for example, singly or in any combination, hardwired circuitry, programmable circuitry, state machine circuitry, and/or firmware that stores instructions executed by programmable circuitry. In this embodiment, each processor core 216 and 218 may comprise respective circuitry that may be compatible and/or in compliance with the Intel® XScale™ Core micro-architecture described in "Intel® XScale™ Core Developers Manual," published December 2000 by the Assignee of the subject application. Of course, circuitry 202 may comprise other types of circuitry without departing from this embodiment.

Interface circuitry 204 may comprise protocol engine and interface circuitry 205. Circuitry 205 may permit integrated circuit 40 to be capable of exchanging, via one or more links 44, data and/or commands with storage 28 using and/or in accordance with the one or more communication protocols via which integrated circuit 40 may be capable of exchanging data and/or commands with storage 28. Interface circuitry 210 may comprise respective interface circuitry that may be used to permit integrated circuit 40 to be able to exchange, in accordance with one of a plurality of different host bus protocols with which bus 22 may comply or be compatible, data and/or commands with one or more other devices, such as, for example, wireless communication device 108, that may be coupled to bus 22.

Integrated circuit 40, interface circuitry 210, processor circuitry 202, and/or interface circuitry 204 may have respective constructions that may be substantially similar to the respective constructions of corresponding circuitry described in, for example, U.S. patent application Ser. No. 10/301,028, entitled "Integrated Circuit Having Multiple Modes Of Operation," filed on Nov. 20, 2002; U.S. patent application Ser. No. 10/301,027, entitled "Integrated Circuit Having Multiple Modes Of Operation," filed on Nov. 20, 2002; and/or U.S. patent application Ser. No. 10/442,705, entitled "Integrated Circuit Capable of Communicating Using Different Communication Protocols," filed on May 20, 2003. Alternatively, without departing from this embodiment, integrated circuit 40, interface circuitry 210, processor circuitry 202, and/or interface circuitry 204 may have respective constructions that may be different, in at least some respects, from the respective constructions of such corresponding circuitry. Of course, many variations are possible without departing from this embodiment.

Figure 2:
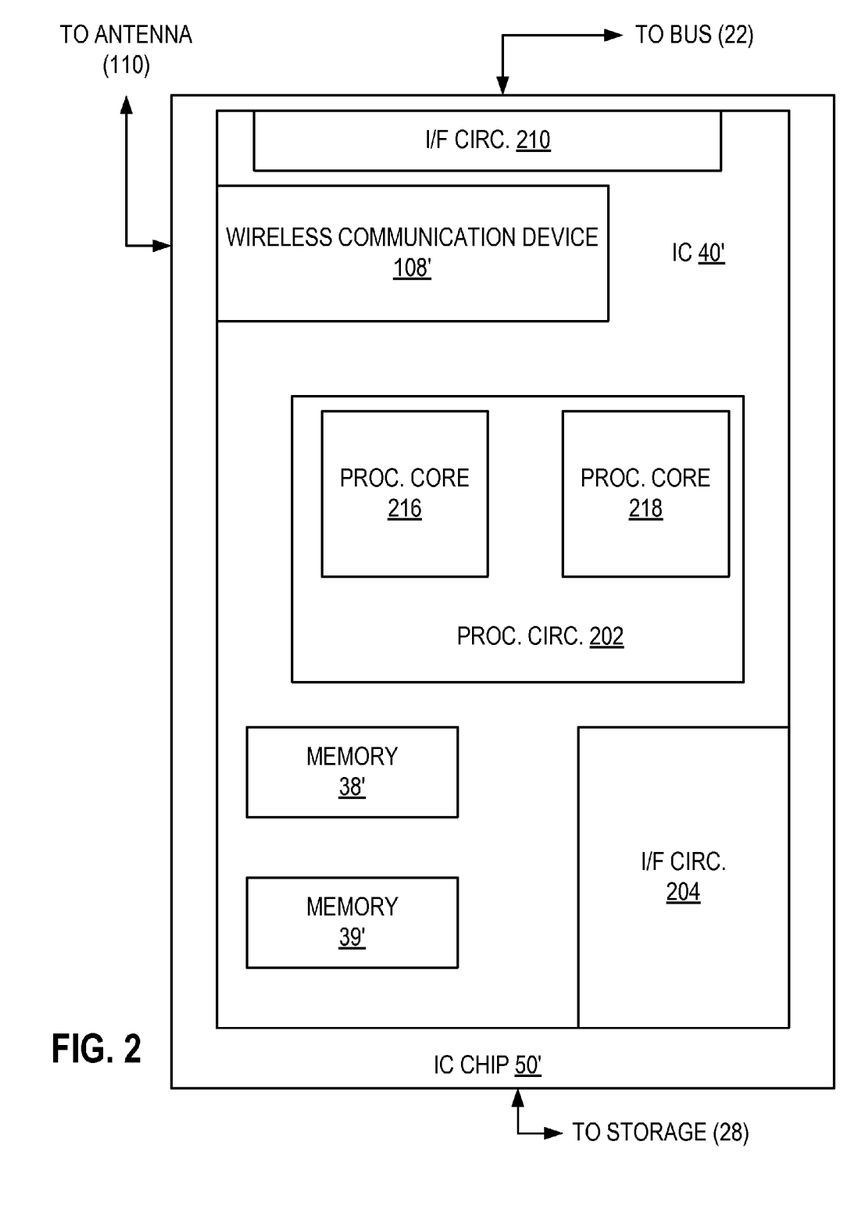
FIG. 2 is a diagram illustrating an integrated circuit according to another embodiment.

In this embodiment, bus 22, wireless communication device 108, memory 38, and memory 39 may be external to integrated circuit 40 and chip 50. However, alternatively, in appliance 100, integrated circuit 40 may be replaced with integrated circuit 40' shown in FIG. 2. In this alternate arrangement, a single integrated circuit chip 50' may comprise integrated circuit 40'. Integrated circuit 40' may comprise wireless communication device 108', memory 38', and memory 39'. Memory 38' and memory 39' may have respective functions that may be similar to the respective functions of memory 38 and 39, respectively. Wireless communication device 108' may be coupled to antenna 110, and may exchange data and/or commands with antenna 110 in a manner that is substantially similar to the manner in which wireless communication device 108 may exchange data and/or commands with antenna 110. Advantageously, if appliance 100 comprises integrated circuit 40' instead of integrated circuit 40, appliance 100 may be more compact, and cheaper and easier to design and implement than if appliance 100 comprises integrated circuit 40.

Returning to FIG. 1, memory 39 may store machine-executable program instructions 107. Subsets of instructions 107 may be executed by processor cores 216 and 218, respectively. The execution of one of these subsets of instructions 107 by processor core 216 may result in processor 216 carrying out, at least in part, one or more RAID-related operations. These RAID-related operations may comprise, for example, one or more operations related to carrying out and/or facilitating implementation of a RAID, such as, for example, RAID 140. The execution of another of these subsets of instructions 107 by processor core 218 may result in processor core 218 loading into memory 38 and executing processes 122. In this embodiment, processes 122 may comprise, for example, wireless communication protocol driver 124, TCP/IP driver 126, iSCSI protocol driver 132, file system driver (e.g., comprising a network file system driver) 128, and operating system driver 130. Of course, the number and type of processes and/or instructions that may be executed by processor core 216 and/or processor core 218 may vary without departing from this embodiment.

The execution of these subsets of instructions 107 by processor cores 216 and 218, and/or the execution of processes 122 by processor core 218 may result in, among other things, integrated circuit 40 performing operations in accordance with an embodiment. These and other operations are described below.

For example, in this embodiment, after a reset of system 10 and/or appliance 100, a client (e.g., client 112A) may generate and issue to appliance 100, via one of the wireless links (e.g., link 114A) a request 116 to store data in or to retrieve data from storage 28. If request 116 is a request to store data in storage 28, the data 118, whose storage in storage 28 is requested by request 116, may be issued from client 112A to appliance 100 via wireless link 114A, and request 116 may indicate one or more locations (e.g., one or more locations 144A in one or more mass storage devices 142A) in storage 28 in which to store the data. Conversely, if request 116 is a request to retrieve data from storage 28, request 116 may indicate one or more locations (e.g., one or more locations 144A) in storage 28 from which to retrieve the requested data. In this embodiment, regardless of whether request 116 is a request to store data in or to retrieve data from storage 28, the one or more locations 144A in storage 28 that may be indicated in request 116 may comprise and/or be indicated in terms of, for example, one or more logical and/or physical addresses, logical and/or physical volumes, logical and/or physical storage and/or mass storage devices, etc., although many alternatives are possible without departing from this embodiment.

Antenna 110 may receive request 116, and thereafter, may transmit request 116 to wireless communication device 108. Wireless communication device 108 may issue request 116 to integrated circuit 40 via bus 22. If request 116 is a request to store data 118 in storage 28, antenna 110 may also receive data 118, and thereafter, may transmit data 118 to wireless communication device 108; thereafter, wireless communication device 108 may issue data 118 to integrated circuit 40 via bus 22.

Integrated circuit 40 may receive request 116 via interface circuitry 210, and may transmit request 116 to processor core 218 in processor circuitry 202. Processor core 218 may receive request 116.

As stated previously, the execution of a subset of instructions 107 by processor core 218 may result in processes 122 being loaded into memory 38 and being executed by processor core 218. In response at least in part to receipt of request 116 by processor core 218, the execution of one or more of processes 122 by processor core 218 may result in processor core 218 determining, in accordance with conventional wireless Ethernet protocol, TCP/IP, iSCSI protocol, file system, and/or operating system techniques, one or more portions of request 116 that may indicate the type of request 116 (e.g., whether request 116 is a request to store data 118 in storage 28 or whether request 116 is a request to retrieve data from storage 28), and/or one or more locations 144A in storage 28 into which the data is to be stored or from which the data is to be retrieved. If request 116 is a request to store data 118 in storage 28, the execution of these processes 122 by processor core 218 also may result in processor core 218 transmitting to and storing in memory 38, a copy 120 of data 118 or a portion of data 118.

The execution of a subset of instructions 107 by processor core 216 may result in processor core 216 executing a RAID driver (not shown). After processor core 218 has determined the one or more portions of request 116 that may indicate the type of request 116 and one or more locations 144A, the execution of this RAID driver may result in processor core 216 examining these one or more portions of request 116. Based at least in part upon this examination of these one or more portions of request 116, processor core 216 may determine, at least in part, one or more locations 144A in storage 28 in which to store data 118. Depending upon the RAID level implemented in RAID 140, the execution of this RAID driver by processor core 216 also may result in processor core 216 determining one or more other locations (e.g., one or more locations 144B in one or more mass storage devices 142N) in which to store check data (e.g., check data 136) in storage 28. Depending upon the RAID level implemented in RAID 140, processor core 218 also may generate, at least in part, check data 136, based at least in part upon copy 120 of data 118. In this embodiment, processor core 216 may be capable of regenerating data 118 based at least in part upon such check data 136. As used herein, "check data" means first data generated based at least in part upon second data and from which the second data may be regenerated at least in part.

More specifically, in this embodiment, the execution of the RAID driver by processor core 216 may result in processor core 216 determining, at least in part, based at least in part upon the one or more portions of request 116 determined by processor core 218, conventional RAID user data and check data mapping techniques, and RAID user data and check data mapping tables (not shown) stored in memory 38, one or more locations 144A and one or more locations 144B. Also in this embodiment, the execution of the RAID driver by processor core 216 may result in processor core 216 generating, at least in part, check data 136, based at least in part upon data 118 (e.g., the copy 120 of data 118) and conventional RAID check data calculation techniques.

In this embodiment, if the RAID level implemented in RAID 140 is equal to zero, check data may be absent from RAID 140, and one or more locations 144A may comprise, for example, locations in RAID 140 of one or more stripes (not shown) of data 118. However, if the RAID level implemented in RAID 140 is greater than one, check data 136 may comprise parity data, and one or more locations 144A and one or more locations 144B may comprise, respectively, locations in RAID 140 of stripes (not shown) of portions of data 118 and check data 136. Alternatively, if the RAID level implemented in RAID 140 is equal to one (i.e., RAID 140 implements data mirroring), check data 136 may comprise a copy of data 118, and one or more locations may comprise, for example, locations of the user data and the redundant copy of the user data in respective mirrored volumes (not shown) in RAID 29. In this embodiment, depending upon the RAID level implemented in RAID 140, processor core 216 may utilize conventional RAID techniques to generate check data 136 based at least in part upon data 118 (e.g., copy 120 of data 118), and/or processor core 216 may be capable of regenerating data 118 based at least in part upon check data 136 and conventional RAID techniques. The check data generated by processor core 216 may be stored, at least in part, in memory 38. Also, prior to generating such check data, processor core 216 may retrieve data 120 from memory 38.

In this embodiment, after processor core 216 has determined, at least in part, one or more locations 144A and one or more locations 144B, processor core 218 may transmit one or more signals to interface circuitry 204. This may result in interface circuitry 204 transmitting to storage 28 request 134, check data 136, and data 118. In this example, request 134 may be a request that storage 28 store data 118 in one or more locations 144A and store check data 136 in one or more locations 144B. After receiving request 134, check data 136, and data 118, storage 28 may execute request 134. This may result in storage 28 storing one or more portions of data 118 in one or more locations 144A, and also may result in storage 28 storing one or more portions of check data 136 in one or more locations 144B.

Conversely, if request 116 is a request to retrieve data from storage 28, after processor core 218 has determined the one or more portions of request 116 that may indicate the type of request 116 and one or more locations 144A, the execution of the RAID driver by processor core 216 may result in processor core 216 examining these one or more portions of request 116. Based at least in part upon this examination of these one or more portions of request 116, processor core 216 may determine, at least in part, one or more locations 144A in storage 28 from which data is to be retrieved from storage 28. More specifically, in this embodiment, the execution of the RAID driver by processor core 216 may result in processor core 216 determining, at least in part, based at least in part upon the one or more portions of request 116 determined by processor core 218, conventional RAID data mapping techniques, and the RAID user data and check data mapping tables stored in memory 38, one or more locations 144A.

After processor core 216 has determined, at least in part, one or more locations 144A, processor core 218 may transmit one or more signals to interface circuitry 204. This may result in interface circuitry 204 transmitting to storage 28 request 134. In this example, request 134 may be a request that storage 28 retrieve data from one or more locations 144A. After receiving request 134, storage 28 may execute request 134. This may result in storage 28 retrieving a copy of the data stored in one or more locations 144A, and transmitting it to interface circuitry 204 via one or more links 44.

Thereafter, the execution of one or more of processes 122 by processor core 218 may result in processor core 218 generating, in accordance with conventional wireless Ethernet protocol, TCP/IP, iSCSI protocol, file system, and/or operating system techniques, request 138. Request 138 may request that wireless communication device 108 transmit the data retrieved from storage 28 to the client 112A that requested the retrieval of the data. The execution of one or more processes 122 by processor core 218 also may result in processor core 218 issuing request 138 and the retrieved data to wireless communication device 108 via interface 210 and bus 22. In response, at least in part, to request 138 and the retrieved data, wireless communication device 108 may transmit the retrieved data to client 112A via antenna 110 and link 114A.

Figure 3:
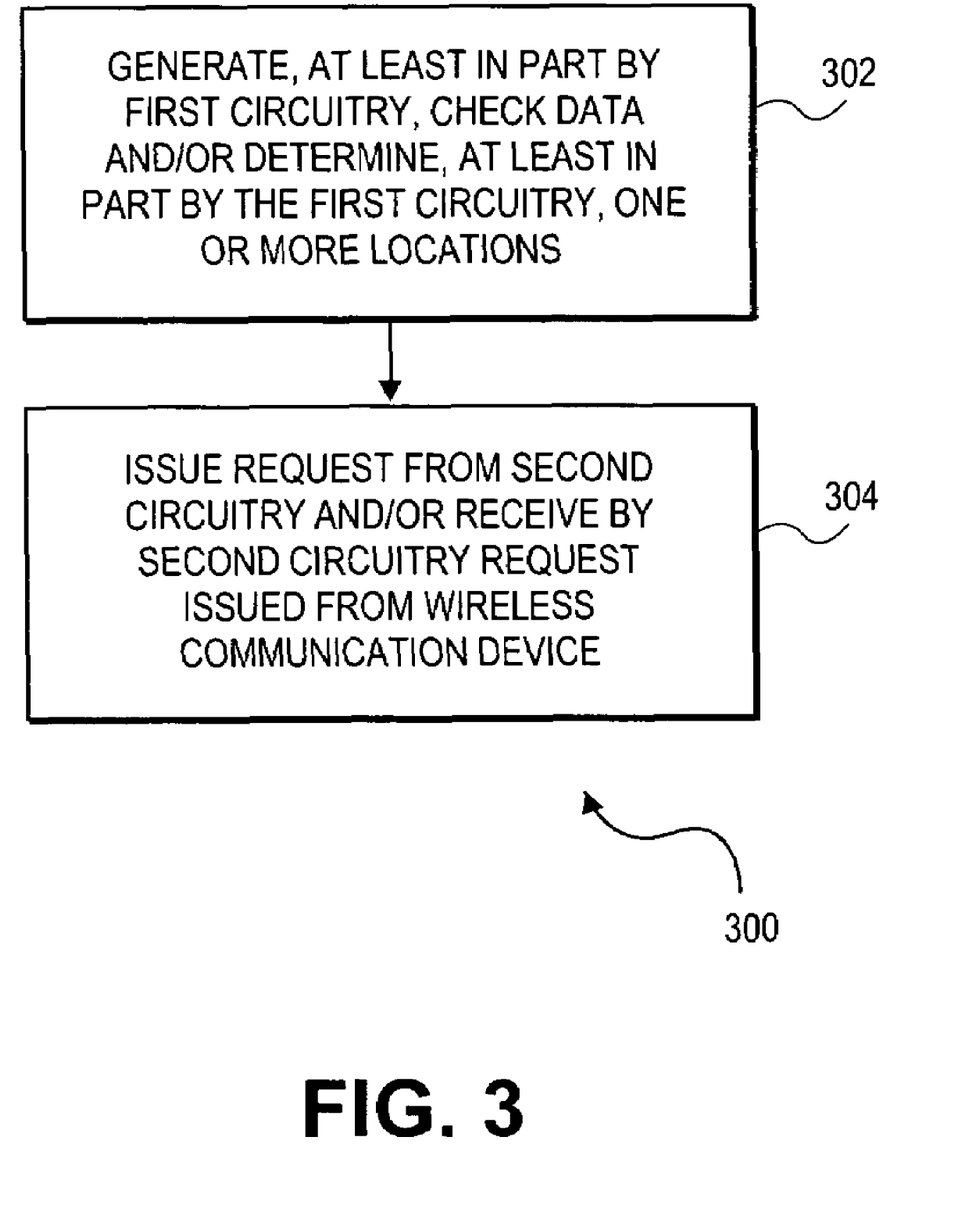
FIG. 3 is a flowchart illustrating operations that may be performed according to an embodiment.

Operations 300 according to an embodiment are summarized in FIG. 3. These operations 300 may comprise generating, at least in part by first circuitry (e.g., processor core 216) comprised in an integrated circuit (e.g., integrated circuit 40), check data (e.g., check data 136), based at least in part upon other data (e.g., data 118), and/or determining, at least in part, by the first circuitry one or more locations (e.g., one or more locations 144A and/or one or more locations 144B) of the check data and/or the other data in storage 28, as illustrated by operation 302 in FIG. 3. In this embodiment, the first circuitry may be capable of regenerating the other data based at least in part upon the check data. These operations 300 also may comprise issuing a request (e.g., request 138) from second circuitry (e.g., processor core 218) also comprised in the integrated circuit, that a wireless communication device (e.g., wireless communication device 108) transmit the other data, and/or receiving, by the second circuitry, a request (e.g., request 116) issued from the wireless communication device, to retrieve the other data, as illustrated by operation 304 in FIG. 3.

Also, in summary, a system embodiment may comprise an integrated circuit comprising first circuitry that may be capable of generating check data based at least in part upon other data, regenerating the other data based at least in part upon the check data, and/or determining one or more locations of at least one of the check data and the other data in storage. The integrated circuit also may comprise second circuitry that may be capable of issuing a request requesting that a wireless communication device transmit the other data, and/or receiving a request, issued from the wireless communication device, to retrieve the other data. In this system embodiment, the storage may comprise a RAID.

The features of this system embodiment may permit the number of integrated circuit chips that may be comprised in this system embodiment, as well as, the number of transfers of data involved in carrying out a client request to store or retrieve data using this system embodiment to be reduced, compared to the prior art. Advantageously, this may permit the amount of latency in completing the client request using this system embodiment, the design complexity of, and time involved in designing this system embodiment, and the cost and power consumption of this system embodiment to be less than may be possible in the prior art. Further advantageously, since the one or more clients and network appliance of this system embodiment may wirelessly communicate with each other, the amount of time and effort involved in setting up this system embodiment may be less than may be involved in setting up a network storage system according to the prior art. Also advantageously, since the one or more clients and network appliance of this system embodiment may wireless communicate with each other, the options available for the geographical locations of the one or more clients and network appliance of this system embodiment may be greater than may be possible in prior art network storage systems, and/or may enhance the portability and utility of such clients compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. For example, circuitry 204 may permit integrated circuit 40 to be able to communicate with storage 28 using a Fibre Channel protocol that complies or is compatible with the interface/protocol described in ANSI Standard Fibre Channel (FC) Physical and Signaling Interface-3 X3.303:1998 Specification.

Further modifications, variations, and alternatives are also possible. For example, operations 302 and 304 may be performed contemporaneously, at least in part. Additionally, operations 300 may comprise more or fewer operations without departing from this embodiment.

Additional modifications, variations, and alternatives are possible. Accordingly, the claims are intended to cover all such equivalents.

What is claimed is:

1. A method comprising:
 (a) generating, at least in part by first circuitry comprising a first processor core, the first circuitry comprised in an integrated circuit, Redundant Array of Independent Disks (RAID) check data based at least in part upon data to be stored in storage, the first circuitry being to regenerate the data based at least in part upon the check data,
 (b) determining, at least in part by the first circuitry, one or more locations of the check data and/or the data in storage,
 (c) issuing, a request from second circuitry comprising a second processor core, the second circuitry also being comprised in the integrated circuit, the request requesting that a wireless communication device transmit the data, and
 (d) receiving, by the second circuitry, a request issued from the wireless communication device, to retrieve the data.

2. The method of claim 1, wherein:
 the integrated circuit comprises the wireless communication device.

3. The method of claim 1, wherein:
 the wireless communication device is external to the integrated circuit.

4. The method of claim 1, wherein:
 an integrated circuit chip comprises the integrated circuit.

5. The method of claim 1, wherein:
 the wireless communication device is coupled to a bus external to the integrated circuit;
 the wireless communication device also is coupled to an antenna; and
 the integrated circuit also comprises interface circuitry to interface the integrated circuit to the bus.

6. The method of claim 1, wherein:
 the storage comprises mass storage.

7. The method of claim 1, wherein:
 the check data comprises error correction data or a copy of the data, the error correction data being calculated based upon, at least in part, the data.

8. The method of claim 1, wherein the first circuitry comprises a first processor core, the second circuitry comprises a second processor core and the check data is Redundant Array of Independent Disks (RAID) check data.

9. An apparatus comprising:
 an integrated circuit comprising:
  first circuitry comprising a first processor core, the first circuitry being to:

(a) generate Redundant Array of Independent Disks (RAID) check data, based at least in part upon data, and (b) regenerate the data based at least in part upon the check data, and the integrated circuit also comprising second circuitry comprising a second processor core, the second circuitry being to:

(c) issue a request requesting that a wireless communication device transmit the data.

10. The apparatus of claim 9, wherein:
the integrated circuit comprises the wireless communication device.

11. The apparatus of claim 9, wherein:
the wireless communication device is external to the integrated circuit.

12. The apparatus of claim 9, wherein:
an integrated circuit chip comprises the integrated circuit.

13. The apparatus of claim 9, wherein:
the wireless communication device is coupled to a bus external to the integrated circuit;
the wireless communication device also is coupled to an antenna; and
the integrated circuit also comprises interface circuitry to interface the integrated circuit to the bus.

14. The apparatus of claim 9, wherein:
the storage comprises mass storage.

15. The apparatus of claim 9, wherein:
the check data comprises error correction data or a copy of the data, the error correction data being calculated based upon, at least in part, the data.

16. An article comprising:
a storage medium storing instructions that when executed by a machine result in the following:

(a) generating, at least in part by first circuitry comprising a first processor core comprised in an integrated circuit, Redundant Array of Independent Disks (RAID) check data based at least in part upon data, the first circuitry being to regenerate the data based at least in part upon the check data, (b) determining, at least in part by the first circuitry, one or more locations of the check data and/or the data in storage, (c) issuing a request from second circuitry comprising a second processor core, the second circuitry also being comprised in the integrated circuit, the request requesting that a wireless communication device transmit the data, and (d) receiving, by the second circuitry, a request issued from the wireless communication device, to retrieve the data.

17. The article of claim 16, wherein:
the integrated circuit comprises the wireless communication device.

18. The article of claim 16, wherein:
the wireless communication device is external to the integrated circuit.

19. The article of claim 16, wherein:
an integrated circuit chip comprises the integrated circuit.

20. The article of claim 16, wherein:
the wireless communication device is coupled to a bus external to the integrated circuit;
the wireless communication device also is coupled to an antenna; and
the integrated circuit also comprises interface circuitry to interface the integrated circuit to the bus.

21. The article of claim 16, wherein:
the storage comprises mass storage.

22. The article of claim 16, wherein:
the check data comprises error correction data or a copy of the data, the error correction data being calculated based upon, at least in part, the data.

23. A system comprising:
an integrated circuit comprising:
first circuitry comprising a first processor core and being to:
(a) generate Redundant Array of Independent Disks (RAID) check data based at least in part upon data,
(b) regenerate the data based at least in part upon the check data, and
the integrated circuit also comprising second circuitry comprising a second processor core and being to:
(c) issue a request requesting that a wireless communication device transmit the data,
the storage comprising a redundant array of independent disks (RAID).

24. The system of claim 23, wherein:
the check data comprises one of:
parity data generated based at least in part upon the data; and
a copy of the data.

25. The system of claim 24, wherein:
the RAID implements a RAID level greater than 1; and
the check data comprises the parity data.

26. The system of claim 23, wherein:
an integrated circuit chip comprises the integrated circuit;
the system also comprises one or more other integrated circuit chips coupled to the integrated circuit, the one or more other integrated circuit chips comprising memory to store instructions and at least a portion of the other data; and
the integrated circuit also comprises processor circuitry to execute the instructions.

27. The system of claim 26, wherein:
the system further comprises one or more additional integrated circuit chips comprising the wireless communication device; and
the one or more additional integrated circuit chips are coupled to the integrated circuit.

* * * * *